United States Patent
Evans

[19]

[11] Patent Number: 6,164,143
[45] Date of Patent: Dec. 26, 2000

[54] TIP FLOW BARRIER FOR A PITOT TUBE TYPE OF FLUID FLOWMETER

[75] Inventor: Russell Neil Evans, Louisville, Colo.

[73] Assignee: Dieterich Standard, Inc., Boulder, Colo.

[21] Appl. No.: 09/130,553

[22] Filed: Aug. 8, 1998

[51] Int. Cl.[7] .................................. G01F 1/46; G01F 1/37
[52] U.S. Cl. ............................. 73/861.65; 73/861; 73/52
[58] Field of Search ........................... 73/861.65, 861.66, 73/861.67, 861.42, 866.05, 861.52, 861.53

[56] References Cited

U.S. PATENT DOCUMENTS

| | | | |
|---|---|---|---|
| 3,803,921 | 4/1974 | Dieterich | 73/861.66 |
| 4,703,661 | 11/1987 | Evers | 73/861.66 |
| 4,961,349 | 10/1990 | Tanis | 73/861.52 |

Primary Examiner—Benjamin R. Fuller
Assistant Examiner—Jagdish Patel
Attorney, Agent, or Firm—Richard W. Hanes

[57] ABSTRACT

A device and method provide improved measurement of flow through an enclosed channel, such as a pipe. A flow measurement device, such as a differential pressure sensing pitot tube, includes a pressure sensing probe that is inserted into the pipe for measuring the rate of fluid flow therein. A compressible or elastic barrier is attached to the distal end of the sensing probe to fill the space between the tip end of the sensing probe and the nearby portion of the inside wall of the fluid carrying pipe. The resilient barrier prevents undesirable fluid flow between the tip end of the sensing probe and the inside wall of the pipe.

11 Claims, 2 Drawing Sheets

TIP FLOW BARRIER FOR A PITOT TUBE TYPE OF FLUID FLOWMETER

TECHNICAL FIELD

This invention relates in general to fluid flow measurement and, more particularly, to a device and method for blocking the flow of fluid between the tip of a pitot tube type of flow sensor and the wall of the fluid conductor in which the pitot tube is installed.

BACKGROUND OF THE INVENTION

Fluid flow measurement in a fluid conducting pipe may be accomplished by various methods. One method includes inserting a pitot tube type of flow measuring device diametrically into the fluid carrying pipe, as shown and described in U.S. Pat. Nos. 4,154,100 and 5,773,726, to which reference is made for a more complete description. Briefly stated, in a measurement method using such apparatus, fluid pressure on the upstream and downstream sides of the pitot tube within the pipe are sensed by the pitot tube probe in order to ultimately produce a differential fluid pressure signal. Typically, flow rate is then determined from the sensed differential pressure using the equation $Q=K\sqrt{DP}$, where Q is the flow rate, DP is differential pressure, and K is a constant empirically or theoretically determined for each combination of pitot tube and pipe diameter.

Following insertion into the fluid-conducting pipe the pitot tube is secured in the pipe by one of several methods. One such method is described in U.S. Pat. No. 4,727,159, where the distal end of the tube may be seated against the inside wall of the pipe opposite the wall through which the pitot tube is inserted and anchored. Another method is to secure the pitot tube to the pipe wall with a flange connection. The flange connection method does not allow for any adjustment of the insertion distance of the tube into the pipe and therefore does not insure contact between the tip of the pitot tube and the pipe wall. Such a mounting method does not allow for pipe expansion, as does the method described in the '159 patent. Because pipe dimensions are not held to a close tolerance, the length of the pitot tube designed for a "fixed" type of installation, such as the flange connection, must be dimensioned so as to accommodate a pipe that is less than the nominal diameter. Accordingly, in installations where the pipe has a diameter that is greater than the length of that portion of the pitot tube that is within the pipe, a gap will exist between the tip of the tube and the nearby inside wall of the fluid carrying pipe.

It has been discovered that the presence of a gap or space between the tip end of the pitot tube and the adjacent wall of the fluid conducting pipe can give rise to error in the flow measurement produced by the pitot tube. When such a gap is allowed to exist the fluid that flows under the pitot tube and through the gap, at a pressure of $P_{static}$, migrates along the downstream side of the pitot tube toward the lower pressure fluid ($P_L$) that exists there. This errant flow may adversely effect the K factor, producing an undesirable error in the calculated flow rate.

Accordingly, it is the primary object of the present invention to provide a pitot tube type of fluid flow measurement instrument with a fluid barrier mounted on its tip end that prevents fluid from flowing through the space between the distal end of the pitot tube and the adjacent pipe wall.

A second object of the invention is to provide a barrier to fluid flow through the gap between the end of a flow measuring probe inserted in a fluid-conducting pipe and the wall of the pipe that is adjacent thereto, where the barrier is substantially the same width and effective depth as the gap.

Another object of the invention is to provide a fluid flow blockage mechanism for the end of a pitot tube that can accommodate gaps having a variety of dimensions.

Other and further objects, features and advantages of the present invention will become apparent upon a reading of the following description of the invention, taken in conjunction with the accompanying drawings.

SUMMARY OF THE INVENTION

According to the principles of the present invention, apparatus is provided to improve the accuracy of flow measurement through an enclosed channel, such as a pipe. A blockage appliance, or fluid barrier, is positioned on the distal end of a fluid flow measuring pitot tube so as to be disposed between the tip of the pitot tube's sensing body and the nearby inside pipe wall. The blockage appliance prevents the fluid in the pipe from flowing between the tip of the pressure sensing body and the adjacent wall of the pipe. In order to accommodate different gap widths that may exist in various installations, the barrier appliance is constructed to be springable, elastic, flexible, pliant or compressible.

DETAILED DESCRIPTION OF THE INVENTION

Figure 1:
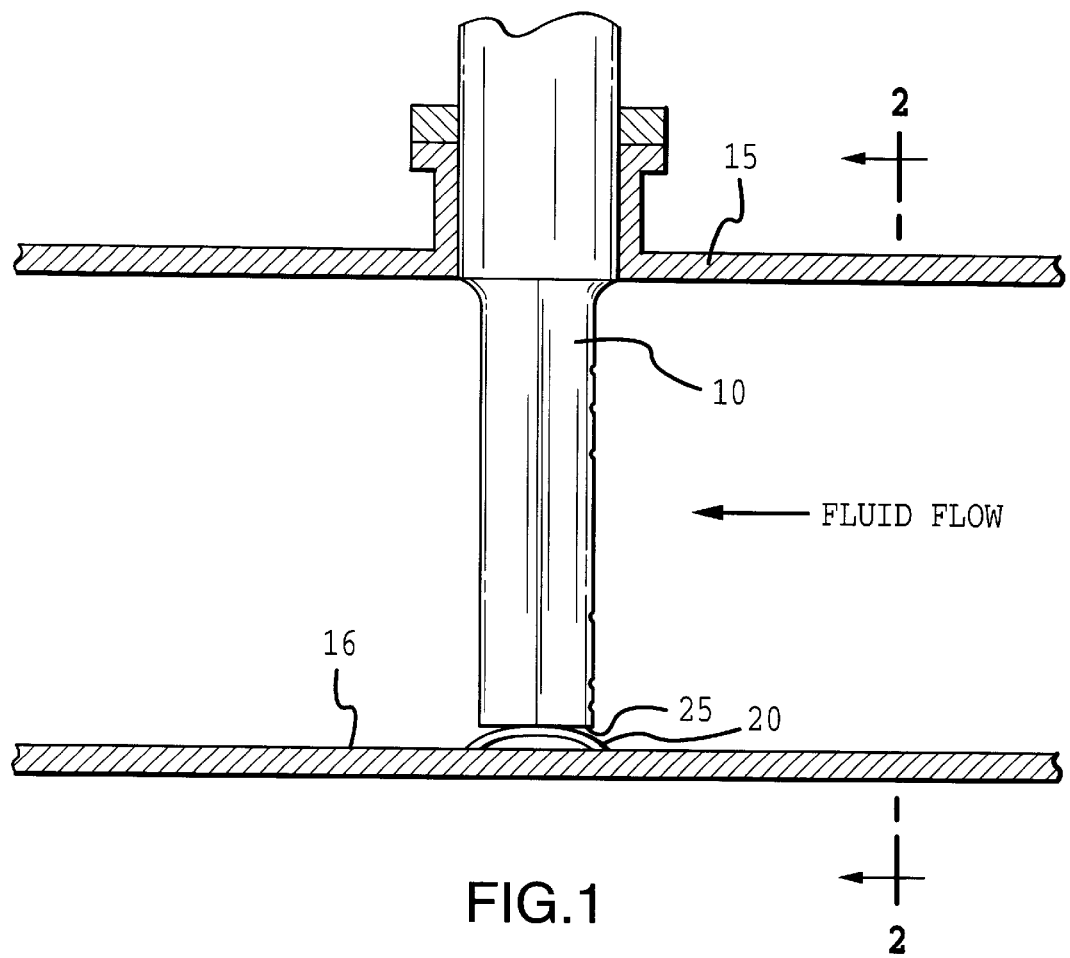
FIG. 1 is a fragmentary longitudinal cross section of a fluid transporting pipe with a pitot tube type of fluid flow meter inserted therein and attached to one wall of the pipe with a flange connection. A space is shown to exist between the end tip of the pitot tube and the adjacent side wall of the pipe. The pitot tube and the attached tip barrier device of the present invention is shown in side elevation.

FIG. 1 illustrates a typical pitot tube type of flow measurement device having a sensing body 10 inserted diametrically into a fluid conducting pipe 15. While the drawings illustrate a bluff body type of pitot tube, the invention is likewise applicable to streamlined or other shapes of pitot tubes or other types of flow sensing probes that are inserted into a fluid carrying conduit. The pitot tube of FIG. 1 is of the type which is flange mounted to the pipe in which it is inserted. For reasons already explained, the distal end 25 of the sensing body does not make contact with the inside wall 16 of the pipe 15, creating a space, or gap, between the tip end of the pitot tube 10 and the pipe wall 16. Without the barrier appliance of the present invention, undesirable fluid flow would occur through this space.

Figure 2:
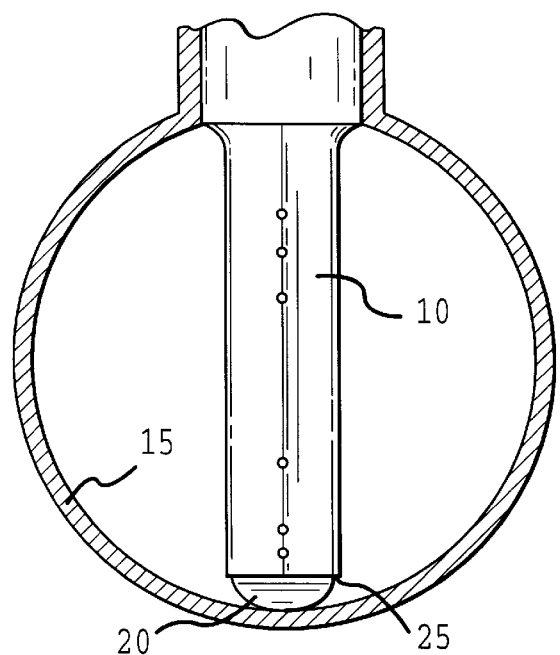
FIG. 2 is a fragmentary lateral cross section through the fluid conducting pipe taken along lines 2—2 of FIG. 1.
Figure 3:
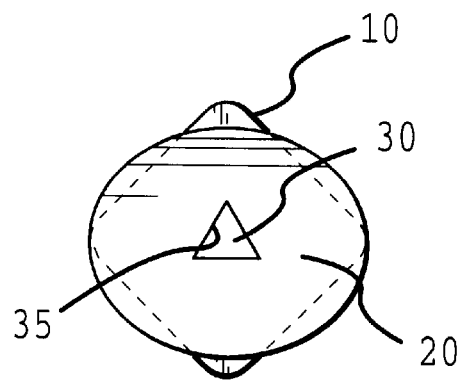
FIG. 3 is a bottom view of the pitot tube with the attached tip barrier shown in plan view.
Figure 4:
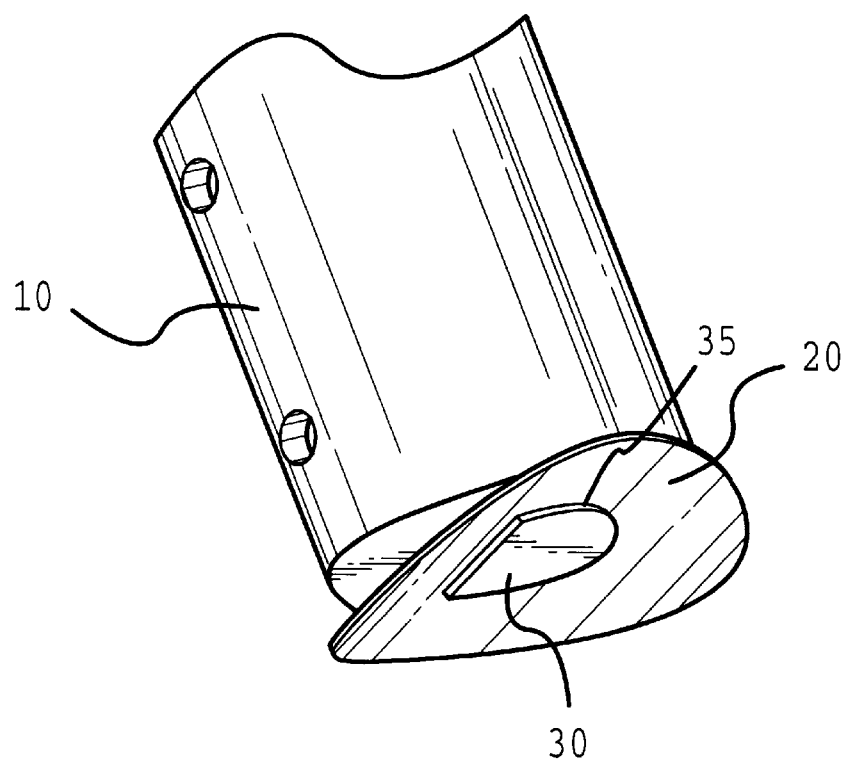
FIG. 4 is a fragmentary perspective view of the tip end of the pitot tube and the spring washer that comprises the blockage device.

In the preferred embodiment of the invention a circular spring washer 20 having a curvature about a single radius is secured to the tip end 25 of the sensing probe 10. As seen in FIG. 2, the front profile of the curved spring washer 20 presents a fluid flow barrier that is disposed between the distal end of the probe 10 and the nearby side wall 16 of the pipe 15. As fluid flows along the pipe 15 and around the sensing probe 10 the springable blockage appliance (or flow barrier) 20 prevents fluid from flowing through the gap between the tip 25 of the bluff body 10 and the adjacent inner surface 16 of the wall of the pipe 15.

In order to accommodate various gap sizes caused by variations in pipe tolerances and to allow for possible thermal expansion of the pipe 15, the flow barrier 20 is elastically deformable, resilient, compressible or in some other way compliant with the dimensions of the gap. The use of the terms "springable" or "elastic" in this specification shall be intended to include all means for accomplishing the objective, of accommodating various dimensions of gaps. While a variety of shapes and configurations of a barrier 20 are possible in order to achieve the objects of the invention, the preferred form of the barrier 20 is that of an annular disk, such as a washer. The annular disk is curved about a radius that is normal to the original flat plane of the disk in order that the disk appears as an annularly shaped section cut out of a cylinder. The curvature of the disk's material causes the barrier 20 to be elastic so that when the annular barrier 20 is pressed into a object it will resume its curved orientation when the pressure is released. The barrier 20 may be formed of any resilient, compressible or elastic material that is suitable for the environment within the pipe 15.

When the sensing probe 10 is inserted into the pipe 15, the barrier 20 compresses or flattens as it is pressed into contact with the inner wall of the pipe 15, filling the gap between the tip 25 of the sensing body 10 and the inner wall 16 of the pipe 15.

The barrier 20 is preferably attached to the tip 25 by welding, cold forming, or any by other suitable means. One method for securing the barrier 20 to the pitot tube tip 25 with the proper curve and profile orientation to the pitot tube includes forming a non-circular stud 30 on the tip 25 of the sensing probe 10. A center aperture 35 in the annular barrier 20 is made to correspond to the cross sectional shape of the stud 30. When the barrier 20 is placed on the stud 30, the profile orientation of the barrier with respect to the direction of fluid flow is fixed until the barrier is welded, or otherwise permanently attached to the tip end of the sensing probe.

What is claimed is:

1. In combination with a pitot tube differential pressure fluid flow sensor disposed diametrically inside a fluid conducting conduit having a wall and a means for blocking fluid flow between a distal tip of the sensor and an adjacent portion of the wall of the conduit, the combination comprising:

a resilient barrier attached to the distal tip of the sensor and disposed between the tip of the sensor and the conduit wall, the barrier having a front profile perpendicular to a direction of fluid flow that prevents fluid flow between the tip of the sensor and the conduit wall.

2. The combination of claim 1 wherein the resilient barrier is attached to the tip of the sensor.

3. The combination of claim 1 wherein the resilient barrier is a spring washer curved about a single radius.

4. The combination of claim 1 wherein the resilient barrier includes a central aperture therein, and further including, a stud projecting from the distal tip of the sensor for reception in the aperture in the barrier, wherein the barrier is selectively directionally oriented with respect to the sensor prior to permanent attachment thereto.

5. An assembly for flow measurement in a pipe having an inner wall, comprising:

a differential pressure sensing probe disposed diametrically within the pipe, the sensing probe having a tip adjacent a portion of the inner wall of the pipe; and spring means extending from the tip for blocking fluid flow between the tip of the sensing probe and the inner wall of the pipe.

6. The assembly of claim 5 wherein the spring means for blocking fluid flow includes a resilient barrier positioned between the tip of the sensing probe and the inner wall of the pipe, wherein the springable barrier obstructs fluid flow between the tip of the sensing probe and the inner wall of the pipe.

7. The assembly of claim 6 wherein the barrier comprises a spring washer curved about a single radius.

8. A method for measuring the fluid flow rate through a pipe, comprising the steps of:

mounting a differential pressure sensing probe having a tip within the pipe, wherein the tip of the probe is adjacent an inner wall of the pipe but spaced therefrom; and, providing a barrier between the tip of the sensing probe and the inner wall of the pipe, wherein the barrier obstructs fluid flow between the tip of the sensing probe and the inner wall of the pipe.

9. The method of claim 8 wherein the step of providing a barrier between the tip of the sensing probe and the inner wall of the pipe includes attaching the barrier to the tip of the sensing probe.

10. The method of claim 8 wherein the step of providing a barrier includes providing a spring washer curved about a single radius.

11. The method of claim 8 and further including the steps of:

providing a stud on the tip of the sensing probe;

forming an aperture in the barrier;

inserting the stud into the aperture of the barrier; and attaching the barrier to the sensing probe.

\* \* \* \* \*

UNITED STATES PATENT AND TRADEMARK OFFICE
CERTIFICATE OF CORRECTION

PATENT NO. : 6,164,143
DATED : DECEMBER 26, 2000
INVENTOR(S) : RUSSELL NEIL EVANS

It is certified that error appears in the above-identified patent and that said Letters Patent is hereby corrected as shown below:

Column 2, Line 39: Insert --Figure 5 is a fragmentary cross sectional perspective view of a fluid conducting conduit in which a pitot tube type of flowmeter having the tip barrier of the present invention is diametrically positioned.--

Add Figure 5.

Column 3, Line 6: following "The use of the terms" delete the word "springable" and insert --"resilient," "spring"--

Signed and Sealed this

First Day of May, 2001

Attest:

NICHOLAS P. GODICI

*Attesting Officer*     Acting Director of the United States Patent and Trademark Office